C. E. COLLINS.
UNBUTTONING IMPLEMENT.
APPLICATION FILED AUG. 5, 1913.
1,084,399.
Patented Jan. 13, 1914.
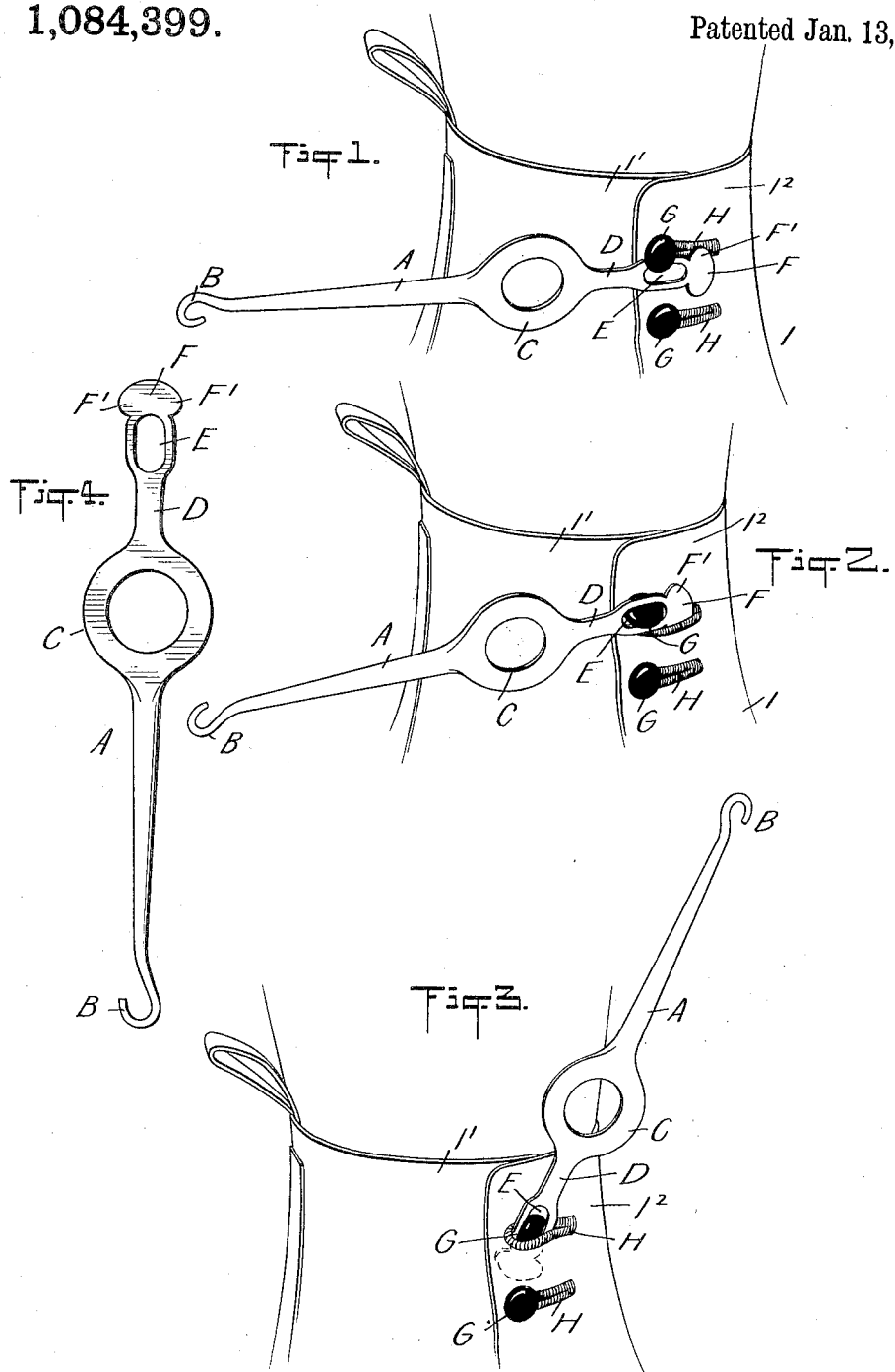
WITNESSES
INVENTOR
CHARLES E. COLLINS
BY
ATTORNEYS

UNITED STATES PATENT OFFICE.

CHARLES E. COLLINS, OF NEW YORK, N. Y.

UNBUTTONING IMPLEMENT.

1,084,399.  Specification of Letters Patent.  Patented Jan. 13, 1914.

Application filed August 5, 1913. Serial No. 783,044.

*To all whom it may concern:*

Be it known that I, CHARLES E. COLLINS, a citizen of the United States, and a resident of the city of New York, borough of Manhattan, in the county and State of New York, have invented a new and Improved Unbuttoning Implement, of which the following is a full, clear, and exact description.

The object of the invention is to provide a new and improved implement for quickly unbuttoning buttoned shoes without danger of unduly straining the buttons or injuring the buttonholes and without requiring much physical exertion or skill on the part of the user or operator.

In order to accomplish the desired result use is made of a handle provided with a flat shank having an elongated aperture and a flat head at the end of the shank, and having its sides projecting beyond the sides of the shank.

A practical embodiment of the invention is represented in the accompanying drawings forming a part of this specification, in which similar characters of reference indicate corresponding parts in all the views.

Figures 1, 2 and 3 are perspective views of the unbuttoning implement in the successive positions for unbuttoning a button on a shoe; and Fig. 4 is a plan view of the unbuttoning implement.

The unbuttoning implement is provided with a handle A terminating at one end in a button hook B for buttoning a shoe, the other end of the handle having a flat portion C for conveniently holding the handle in position in the hand without danger of the handle turning in the operator's hand. The flat portion C terminates in a flat shank D provided at its end with an elongated aperture E, the shank terminating in a flat head F having its sides F' projecting beyond the sides of the shank D at the aperture E. The aperture E is adapted to engage about one-half of the button G while the head F is adapted to pass through the buttonhole H, it being understood that the button G is attached to the rear flap I' of the shoe while the buttonhole H is on the front flap I² of the shoe.

In using the unbuttoning implement, the operator places the shank D flat against the outer face of the flap I² with the aperture E adjacent and below the button G, and one side F' of the head F at the rear end of the buttonhole H, as shown in Fig. 1. The operator now gives an upward quarter turn to the unbuttoning implement so that the lower half of the button G passes edgewise into the aperture E while the inner side F' of the head F passes through the rear portion of the buttonhole H, as shown in Fig. 2. The operator now swings the implement upward, past a vertical position, as illustrated in Fig. 3, and during this movement the head F passes completely through the buttonhole H and with it the button G. A slight downward push on the implement now disengages the latter from the button and then the implement is drawn outward so as to disengage the shank D from the buttonhole H.

The head F has its peripheral edge rounded off or approximately semicircular, so that the said edge readily passes through the buttonhole on swinging the implement upward from the position shown in Fig. 2 to the position indicated in Fig. 3. By engaging approximately one-half of the button edgewise with the aperture E, as shown in Figs. 1 and 2, the button forms a fulcrum for the implement to swing on, and the button is pushed edgewise through the buttonhole. The buttons G are approximately hemispherical and have a flat base with a depending central eye G', and the aperture E is intended to receive only approximately one-half of the button edgewise with the eye resting on the flat shank portion to one side of the aperture E, and hence when the implement is moved around the button G is carried along with the base in an approximately vertical plane to cause the button to readily pass through the buttonhole H.

Having thus described my invention, I claim as new and desire to secure by Letters Patent:

An unbuttoning implement, comprising a handle having a flat shank provided at its end with an elongated aperture for engagement with the button, and a flat head integral on the end of the shank and having its sides projecting beyond the sides of the shank.

In testimony whereof I have signed my name to this specification in the presence of two subscribing witnesses.

CHARLES E. COLLINS.

Witnesses:
 THOMAS BRADY,
 C. F. FREEMAN.